US006259563B1

(12) United States Patent
Eckerl

(10) Patent No.: US 6,259,563 B1
(45) Date of Patent: Jul. 10, 2001

(54) OPTICAL SYSTEM FOR IMAGE ROTATION

(76) Inventor: Klaus Eckerl, Leitenweg 7, 94116 Hutthurm (DE)

( * ) Notice: Subject to any disclaimer, the term of this patent is extended or adjusted under 35 U.S.C. 154(b) by 0 days.

(21) Appl. No.: 09/395,816

(22) Filed: Sep. 14, 1999

(30) Foreign Application Priority Data

Sep. 15, 1998 (DE) ............................................. 198 42 150

(51) Int. Cl.$^7$ .................................................. G02B 27/10
(52) U.S. Cl. ......................... 359/625; 359/211; 359/710; 396/330; 355/132; 219/121.67; 250/203.3
(58) Field of Search .................................... 359/625, 211, 359/834, 710; 396/330, 306; 355/132; 219/121.67; 250/203.3, 342

(56) References Cited

U.S. PATENT DOCUMENTS

| 1,525,658 | * | 2/1925 | Roach | ................................. | 359/710 |
|---|---|---|---|---|---|
| 3,734,618 | * | 5/1973 | Dudley | ................................. | 359/710 |
| 4,822,974 | * | 4/1989 | Leighton | ............................. | 359/211 |
| 5,512,741 | * | 4/1996 | Levaillant et al. | ................... | 359/211 |

FOREIGN PATENT DOCUMENTS 0690327    1/1996   (EP) .

* cited by examiner

Primary Examiner—Loha Ben
(74) Attorney, Agent, or Firm—Webb Ziesenheim Logsdon Orkin & Hanson, P.C.

(57) ABSTRACT

An optical system for image rotation comprises two Pechan prisms (8, 9) located on an optical axis (4) and a lens system located on the same optical axis. The two Pechan prisms (8, 9) can be rotated relative to each other around the optical axis (4). They are located next to each other without the interposition of lenses. The lens system comprises two lens subsystems (6, 7) that are located one on each side of the pair of Pechan prisms, and between which there exists a telecentric beam path.

18 Claims, 4 Drawing Sheets

OPTICAL SYSTEM FOR IMAGE ROTATION

BACKGROUND OF THE INVENTION

1. Field of the Invention

This invention relates to an optical system for image rotation comprising two Pechan prisms located on an optical axis and a lens system located on the same optical axis, whereby the two Pechan prisms can be rotated relative to each other around the optical axis.

2. Description of Related Art

A similar optical system is described in W087/07391. This system is designed to be used in the printing industry, where under certain conditions it is necessary to rotate an image by 90°. In this system, one of the two Pechan prisms is located in the air space between an 8-lens image-reversing lens system and its subject plane, and the other Pechan prism is located in the air space between the lens system and its focal plane.

The optical system of the prior art has the disadvantage that the Pechan prisms must be made of expensive, heavy and highly refractive glass, the refractive index of which is on the order of magnitude of 1.73 to 1.76.

The present invention provides an optical system of the type described above that is both lighter in weight and more economical to manufacture than similar systems of the prior art.

SUMMARY OF THE INVENTION

The present invention contemplates that two Pechan prisms are located next to one another, without the interposition of lenses, and that the lens system comprises two lens subsystems that are located one on either side of the pair of Pechan prisms, and between which there is a telecentric beam path. In the optical system of the present invention, a telecentric beam path therefore dominates in the Pechan prisms in parallel and between the two Pechan prisms. As a result of the arrangement of the Pechan prisms of the invention and the configuration and arrangement of the lens system, inside the prisms there is a parallel beam path with small angles of the beam width. This represents a fundamental difference between the system of the invention and similar systems of the prior art. This difference becomes particularly significant if the conditions on the 45° bevel of the Pechan prisms are taken into consideration, because in the optical system of the invention, with an appropriate design of the lens system, a small beam angle (e.g. a maximum±3.8°) can be maintained. Under these conditions, total reflection on the 45° bevel can be achieved even with a relatively low-refractive glass (e.g. with a refraction index of 1.52). In the optical system of the prior art, on the other hand, there is no parallel beam path inside the Pechan prisms, which means that the angles of incidence that occur on the 45° bevels are significantly less than or greater than 45°, which, on account of the total reflection inside the prisms at excessive field angles—as described above—makes it necessary to use heavy and more expensive highly refractive glass.

Compared to similar systems of the prior art, the optical system of the present invention is also characterized by the additional advantage that it requires fewer optical correction elements. As a result of the parallel beam path with a small angle of the beam width inside the prisms and between the prisms, the (angle-dependent) aberrations that must be corrected are significantly smaller than in the case of the generic optical system of the prior art. In the system of the invention, the geometric aberrations are therefore easier to compensate than in the prior art. The completely symmetrical combination of the prisms and lens systems (depending on the scale of the imaging) that is possible in the context of this invention also makes it easier to correct the system. In the ideal case ($\beta'=-1$), there is also a complete compensation for bilateral error. For example, with the optical system of the invention, only the color error that occurs as a result of the long optical path through the glass needs to be corrected. It is appropriate if, for the manufacture of the lenses of the lens system, glass with anomalous partial dispersion is used, to keep the color cross error and longitudinal errors within specified dimensions.

The aspects of the optical system explained above also have an altogether advantageous effect in that it becomes possible to realize a relatively high aperture (transmission). The relative geometric aperture of the optical system of the instant invention can be greater than in similar systems of the prior art, because a telecentric beam path dominates between the prisms. The result, for the chief rays, are angles in the prism system of approximately 0°, i.e. parallel to the optical axis. The peripheral rays are oriented as a function of the aperture/type of glass of the prism. For example, with a BK7 prism, there is an allowable aperture in the intermediate image plane (see below) of approximately 0.07 or k=7.5. When a more highly refractive glass is used for the manufacture of the prisms (e.g. SK16 with a refraction index of 1.62), there is a maximum aperture of 0.12 or k=4.2. In this case, a maximum beam angle of ±6.9° is allowable. In this context, it should be noted that glass of type SK16 differs significantly in terms of both weight (factor 0.94) and price (factor 0.23) from a glass of type LAK10 with a refraction index of 1.73, of the type that must be used to manufacture the prisms of the generic optical system of the prior art.

In the optical system of the invention, it is also possible to use two absolutely identical Pechan prisms, which, in turn, results in a cost advantage over systems of the prior art. The prisms are also far more compact than in the image rotation optics system of the prior art, because the prism group is located inside the optical image and is determined only by the aperture, but not by the field angle of the system. This situation is also expressed in a reduction of cost and weight.

A first preferred refinement of the optical system of the invention is characterized by the fact that an intermediate or first image is generated by a suitable tuning of the lens system between the two Pechan prisms. This intermediate image makes it possible to easily connect any desired optical unit to the optical system. This image can also be transmitted by different optical systems. In this sense, it is possible, if necessary, to separate the optical system of the invention between the two Pechan prisms, and to realize any desired optical function in the telecentric beam path that is present there. For example, a scale can be inserted. In this context it should be noted that the distance between the two prisms must be sufficiently great so that the intermediate image generated inside the prism groups is not disrupted by surface impurities.

The optical system of the invention can be very advantageously used in a variety of applications. Among these potential applications is the printing industry. No less important is the use of the optical system claimed by the invention in connection with ARRI™ film cameras. Conventional ARRI™ standard optics can be used by a 1:1 imaging system. The primary advantage of the use of the optical system of the present invention in connection with ARRI™ film cameras is the rotation on the optical axis. In systems of the prior art, image rotation required a system in which there was a 90° deflection ("periscope"). In this application, the Pechan prism that faces the image is appropriately mounted so that it can rotate, because in this case the rotational movement of the prism and the rotation of the image generated are in the same direction. This invention can also be used to great advantage in the field of testing and measurement technology, in particular for the inspection of the inside walls of tubes and other small-diameter cavities. In this case, the optical system of the invention makes it possible to compensate for the rotation of the image that is caused by the rotation of a system of mirrors.

Solely for purposes of clarification, it should be noted at this point that, in the context of this invention, the relative rotation of the two Pechan prisms in relation to one another can result from the (absolute) rotation of only the one prism, of only the other prism, or of both prisms.

BRIEF DESCRIPTION OF THE DRAWINGS

The invention is explained in greater detail below with reference to the accompanying drawings, in which.

DETAILED DESCRIPTION OF THE PREFERRED EMBODIMENTS

Figure 1:
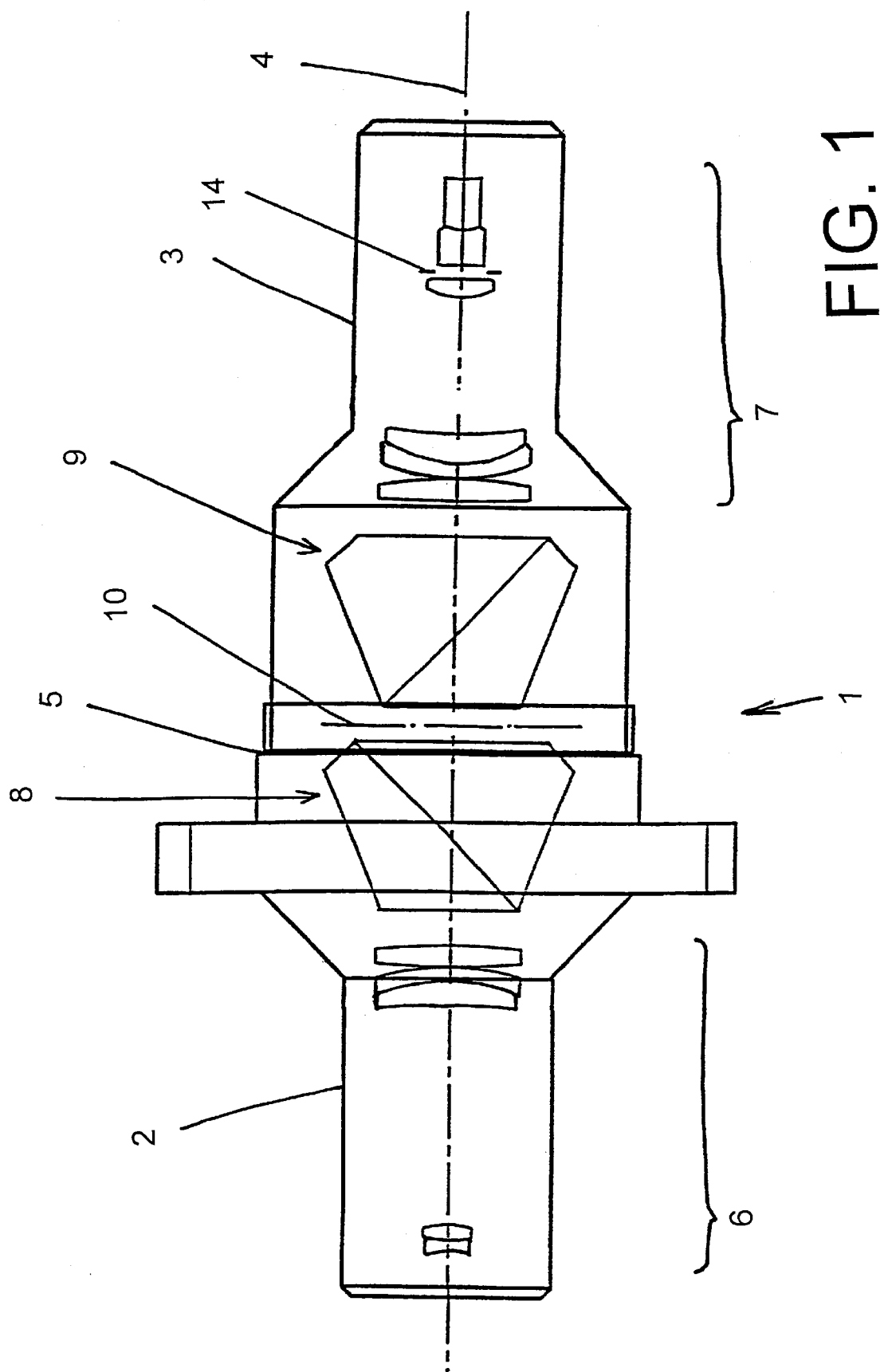
FIG. 1 is a schematic diagram through a preferred exemplary embodiment of the optical system of the present invention.
Figure 2:
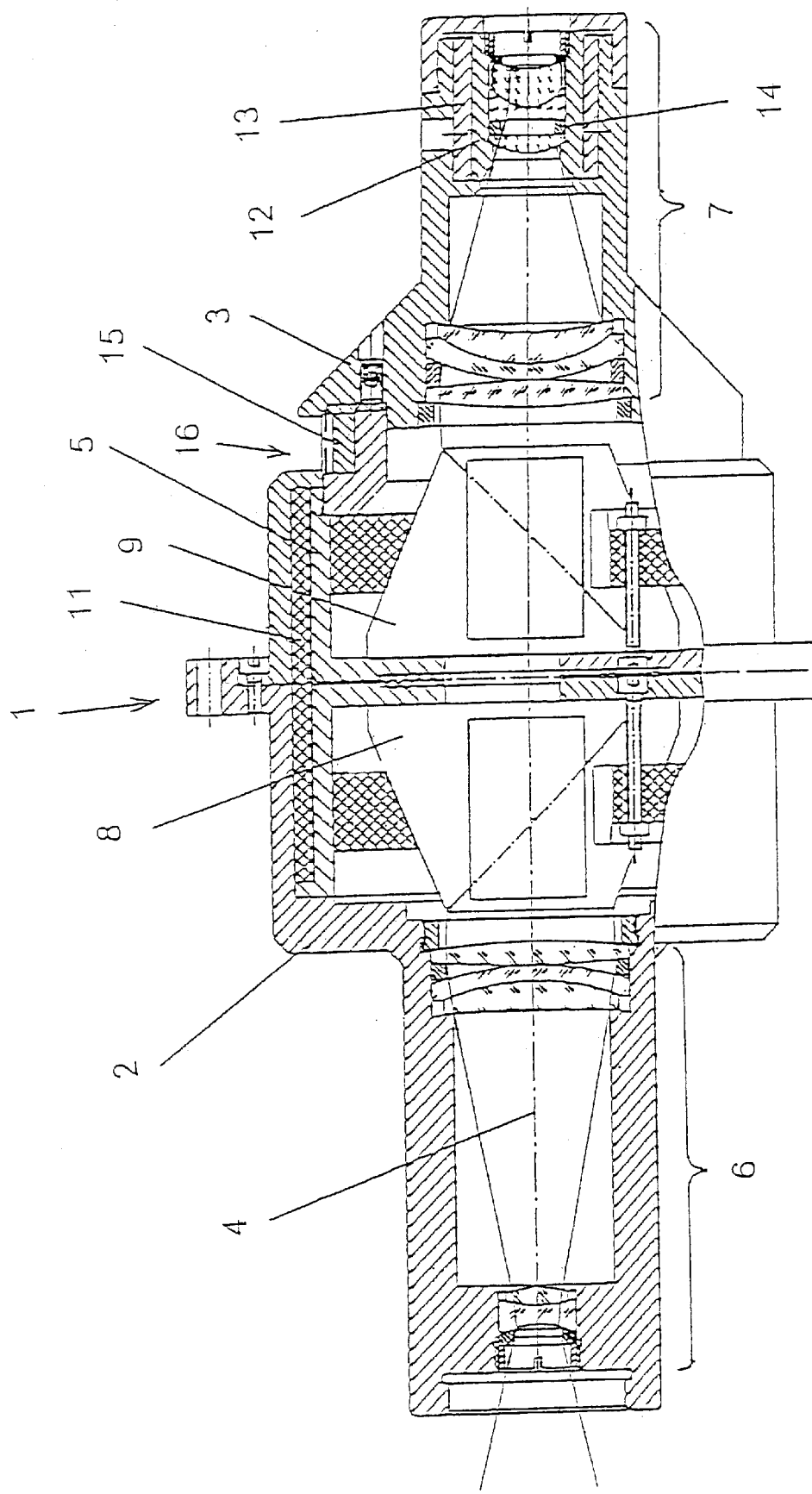
FIG. 2 is a sectional view of the constructive realization of the system illustrated schematically in FIG. 1.

The rotation optics system illustrated schematically in FIG. 1 and in detail in FIG. 2, which is designed in particular for use in the printing industry, comprises a housing 1 that is composed of two housing halves 2 and 3 that are bolted to each other. The housing half 2 faces the subject, while the housing half 3 on the other hand faces the image. Mounted one in each of the two housing halves are lens systems 6 and 7 respectively and Pechan prisms 8 and 9 respectively. The two lens subsystems 6 and 7 together represent one lens system.

With specific reference to FIG. 2, the Pechan prism 9 mounted in the housing half 3 can be rotated around the optical axis 4. For this purpose, it is housed in a rotating part 5 which is rotationally mounted in the bushing 11 around the optical axis 4. Attached to the rotating part 5 is a toothed ring 15, which makes possible the displacement of the rotational part 5 externally via a motor—not shown—and a pinion. The housing half 3, in the vicinity of the toothed ring 15, has a penetration 16 through which the pinion can engage in the toothed ring 15. The two lens subsystems 6 and 7 are constructed similar to each other. Each lens subsystem thereby comprises two groups of lenses. The outer lens group that faces the subject or image is therefore an achromat with glass with anomalous partial dispersion, whereby there is another individual lens on the image side. The second lens group, which faces the respective Pechan prism, represents a three-lens system in the form of an achromat with glass with anomalous partial dispersion combined with a single lens facing the prism. Considering the fact that the optical system can have a relatively small diameter (e.g. 6–8 mm) in the vicinity of the first, outer lens groups, the required accuracy in terms of centering, register accuracy of the mechanical/optical group and tolerances can be maintained. The outer lens group of the lens system 7 that faces the image is held for calibration purposes in a double cam 12, 13 mounted in the housing half 3. A focusing capability can also be provided in the form of the ability to move a lens group axially.

Inside the outer lens group of the lens subsystem 7, an iris diaphragm 14 stands in the beam space to set the aperture of the optical system. Between the two lens subsystems 6 and 7 there is a telecentric, parallel beam path. In particular, there is also a parallel, telecentric beam path in the intermediate plane 10 between the two Pechan prisms 8 and 9.

The rotation of the Pechan prism 9 by an angle of 45° causes an image rotation by 90°. A continuous larger or smaller image rotation is possible at correspondingly larger or smaller angles of rotation. The rotation optics system illustrated also makes possible a continuous rotation of the image.

Figure 3:
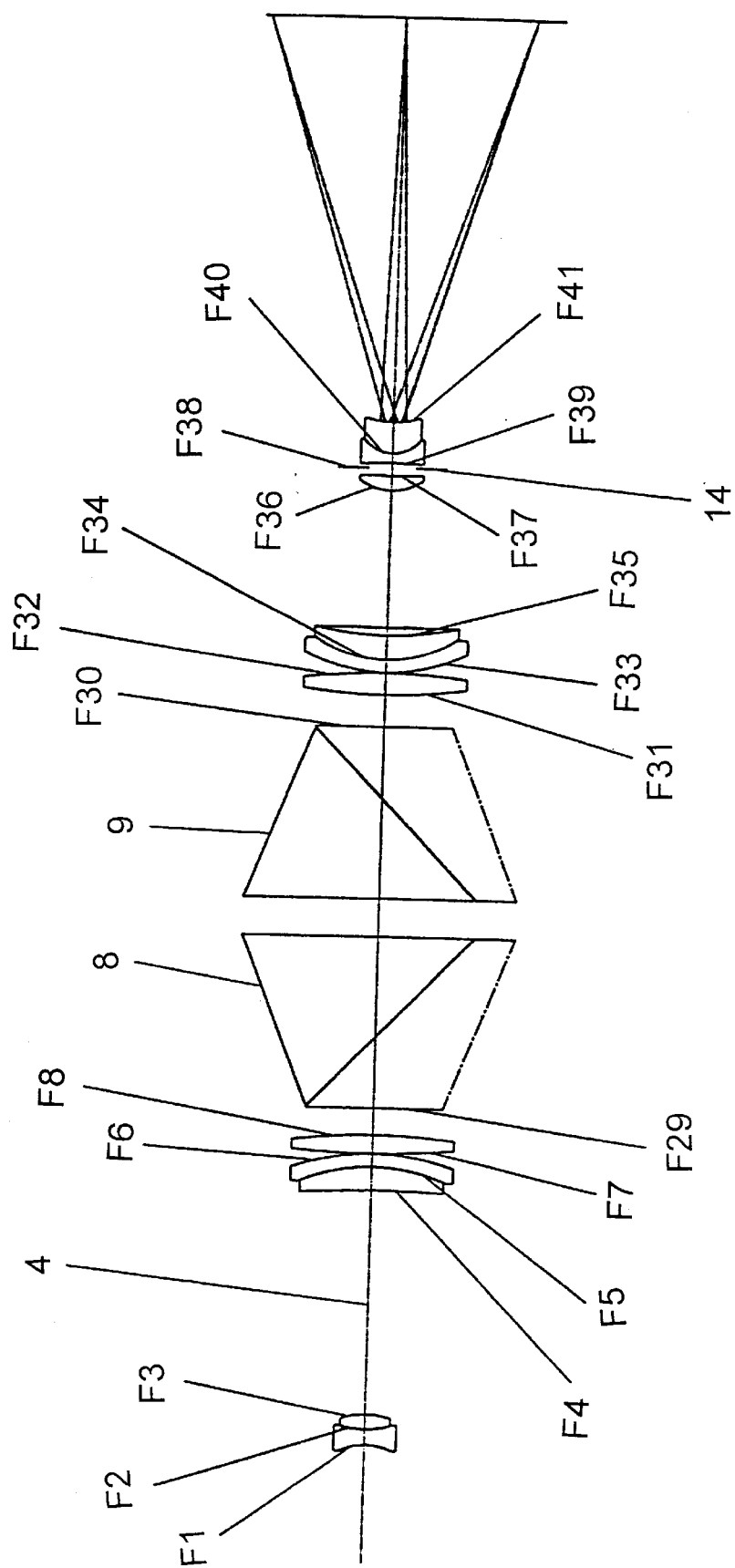
FIG. 3 shows the optical elements of the system illustrated in FIGS. 1 and 2.

The optical elements of the rotation optics illustrated in FIG. 2 are shown individually in FIG. 3. The optical data for this system are presented in Table 1 below. In this table, the optical surfaces are defined in terms of radius and clear diameter. The material of which the total of eleven lenses are made is also indicated. As shown, only four different types of glass are needed for the manufacture of the total of eleven lenses, which has a favorable effect on the manufacturing costs. (By way of comparison, seven different types of glass are required to manufacture the lenses in the optical system described in WO 87/07391.

TABLE 1

The optical data of the system of FIG. 3

EFL = −61.645
Subject dustance = 313.988

| # RADIUS SEPN | CLEAR DIAMETER | MATERIAL |
|---|---|---|
| F1 −10.25700 | | |
| | | S-SF1 |
| F2 14.94825 | 6.202 | |
| | | S-PSK53A |
| F3 −12.81100 | 6.732 | |
| | | Air |
| F4 −173.20300 | 20.982 | |
| | | S-SF1 |
| F5 −32.51500 | 21.588 | |
| | | S-PSK53A |
| F6 −40.65000 | 22.236 | |
| | | Air |
| F7 135.43000 | 22.458 | |
| | | S-PSK53A |
| F8 −102.40500 | 22.456 | |
| | | Air |
| F29 PLANE | 22.000 | |
| | | Prisms |
| F30 PLANE | 22.000 | |
| | | Air |
| F31 87.73500 | 22.694 | |
| | | S-PSK53A |
| F32 −115.68000 | 22.598 | |
| | | Air |
| F33 28.62500 | 22.022 | |
| | | S-PSK53A |
| F34 20.23000 | 20.850 | |
| | | S-SF1 |
| F35 53.88000 | 19.930 | |
| | | Air |
| F36 8.51800 | 7.826 | |
| | | S-FK51 |
| F37 283.74000 | 6.924 | |
| | | Air |
| F38 PLANE | 5.891 | (Diaphragm) |
| | | Air |

TABLE 1-continued

| | | | |
|---|---|---|---|
| F39 | −86.04000 | 5.402 | |
| | | | S-SFL6 |
| F40 | 5.67700 | 4.904 | |
| | | | S-FK51 |
| F41 | 12.93000 | 4.912 | |

Thick crown == crown 158.406 mm
Track 535.175 =00' image length

Figure 4:
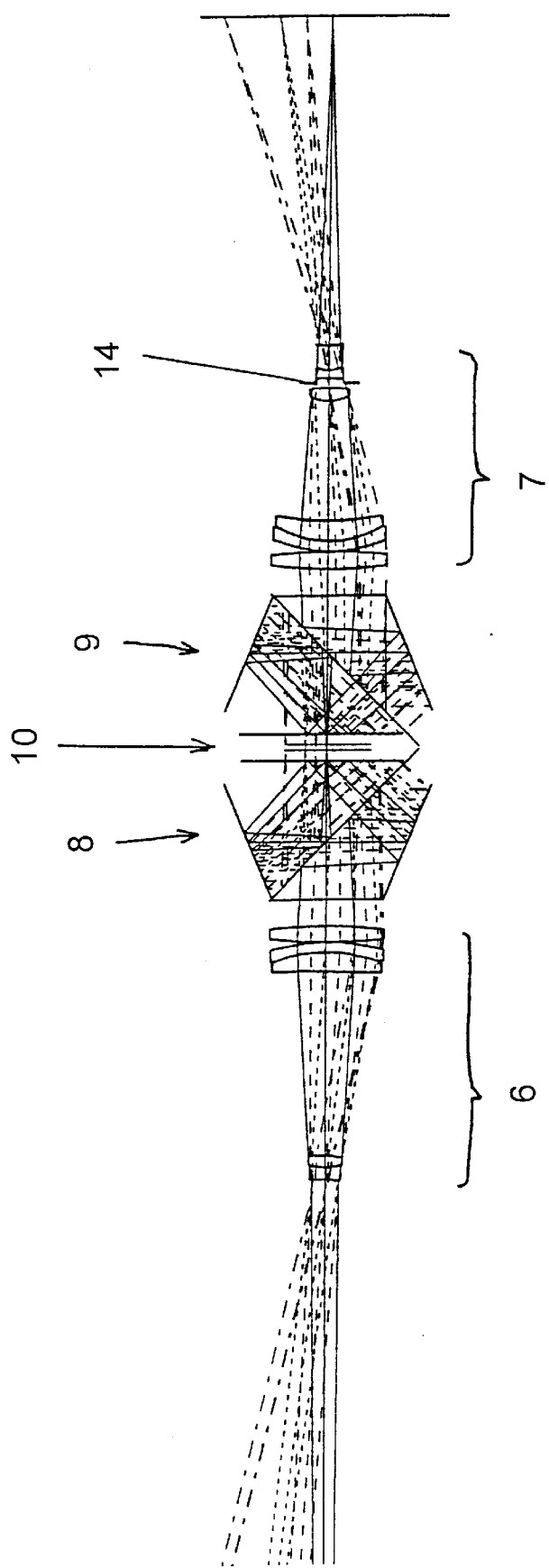
FIG. 4 shows the beam path through the optical elements illustrated in FIG. 3.

The beam path through the optical system illustrated in FIGS. 2 and 3 is illustrated in FIG. 4. This figure clearly shows the parallel beam path with small angles of the beam width inside the prisms. The figure also clearly shows the telecentric beam path between the Pechan prisms 8 and 9 as well as the image in the intermediate image plane 10.

What is claimed is:

1. Optical system for image rotation, comprising two Pechan prisms located on an optical axis, and a lens system located on the same optical axis, with the two Pechan prisms rotatable about said optical axis relative to each other, wherein the two Pechan prisms are located next to one another without the interposition of lenses, a first image is generated between the two Pechan prisms, and the lens system comprises two lens subsystems that are located one on each side of the two Pechan prisms, and between which exists a telecentric beam path.

2. Optical system as claimed in claim 1, wherein the two Pechan prisms are constructed identically.

3. Optical system as claimed in claim 2, wherein the two Pechan prisms are arranged symmetrically with respect to each other.

4. Optical system as claimed in claim 2, wherein the two lens subsystems are constructed identically to each other and are arranged symmetrically with respect to each other.

5. Optical system as claimed in claim 2, wherein the lens system includes lenses made of a glass with anomalous partial dispersion.

6. Optical system as claimed in claim 3, wherein the two lens subsystems are constructed identically to each other and are arranged symmetrically with respect to each other.

7. Optical system as claimed in claim 3, wherein the lens system includes lenses made of a glass with anomalous partial dispersion.

8. Optical system as claimed in claim 1, wherein the two lens subsystems are constructed identically to each other and are arranged symmetrically with respect to each other.

9. Optical system as claimed in claim 8, wherein the lens system includes lenses made of a glass with anomalous partial dispersion.

10. Optical system as claimed in claim 1, wherein the lens system includes lenses made of a glass with anomalous partial dispersion.

11. Optical system as claimed in claim 1, wherein the two Pechan prisms are constructed identically.

12. Optical system as claimed in claim 11, wherein the two Pechan prisms are arranged symmetrically with respect to each other.

13. Optical system as claimed in claim 11, wherein the two lens subsystems are constructed identically to each other and are arranged symmetrically with respect to each other.

14. Optical system as claimed in claim 11, wherein the lens system includes lenses made of a glass with anomalous partial dispersion.

15. Optical system as claimed in claim 12, wherein the two lens subsystems are constructed identically to each other and are arranged symmetrically with respect to each other.

16. Optical system as claimed in claim 12, wherein the lens system includes lenses made of a glass with anomalous partial dispersion.

17. Optical system as claimed in claim 1, wherein the two lens subsystems are constructed identically to each other and are arranged symmetrically with respect to each other.

18. Optical system as claimed in claim 17, wherein the lens system includes lenses made of a glass with anomalous partial dispersion.

* * * * *

UNITED STATES PATENT AND TRADEMARK OFFICE
CERTIFICATE OF CORRECTION

PATENT NO. : 6,259,563 B1
DATED : July 10, 2001
INVENTOR(S) : Klaus Eckerl

It is certified that error appears in the above-identified patent and that said Letters Patent is hereby corrected as shown below:

<u>Column 4,</u>
Line 28, before "By" delete "(".
Line 36, Table 1 heading, "Subject dustance" should read -- Subject distance --.

Signed and Sealed this

Twenty-ninth Day of January, 2002

Attest:

JAMES E. ROGAN
*Attesting Officer*     *Director of the United States Patent and Trademark Office*